(12) United States Patent
Sherwin

(10) Patent No.: US 7,746,613 B1
(45) Date of Patent: Jun. 29, 2010

(54) METHOD AND APPARATUS FOR PROVIDING AN ADAPTIVE CURRENT LIMITER

(75) Inventor: James S. Sherwin, Hillsborough, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 659 days.

(21) Appl. No.: 11/713,462

(22) Filed: Feb. 28, 2007

(51) Int. Cl.
*H02H 3/08* (2006.01)
*H02H 9/02* (2006.01)

(52) U.S. Cl. .................. 361/93.1; 361/93.9; 327/72
(58) Field of Classification Search ............... 361/93.1, 361/93.9; 327/72
See application file for complete search history.

(56) References Cited

U.S. PATENT DOCUMENTS

| 4,737,901 A * | 4/1988 | Woodward | 363/43 |
| 6,304,108 B1 * | 10/2001 | Inn | 327/72 |
| 7,193,872 B2 * | 3/2007 | Siri | 363/95 |

OTHER PUBLICATIONS

Horowitz, The Art of Electronics, 1989, Cambridge University Press, pp. 180-182.*

\* cited by examiner

*Primary Examiner*—Stephen W Jackson
*Assistant Examiner*—Zeev Kitov
(74) *Attorney, Agent, or Firm*—TIPS Group

(57) ABSTRACT

An adaptive current limiter is coupled to a power source and which comprises a variable reference voltage generator which provides a variable reference voltage which is inversely proportional to the input voltage from the power source, which in certain embodiments is representative of the maximum allowable current level that may flow through a connected load at the present voltage provided by the power source given a fixed power limit. The current flow to the load is interrupted when the power level provided to the load exceeds predefined constant power and/or constant current limits.

18 Claims, 7 Drawing Sheets

METHOD AND APPARATUS FOR PROVIDING AN ADAPTIVE CURRENT LIMITER

BACKGROUND

Exemplary embodiments disclosed herein pertain to current limiters, i.e. circuit breakers. More particularly, exemplary embodiments disclosed herein pertain to adaptive current limiters which modify their behavior based on a dynamically changing set of operating conditions.

FIG. 1 is a schematic diagram wherein a prior art telecommunications power card 2 is depicted. The purpose of telecommunications power card 2 is to provide constant voltage to a load that is connected to it.

On the exterior of the card, common node 4 and negative $V_{IN}$ node 6 are disposed to connect to a voltage source providing, for example, −48 volts. The term "node" refers to any equipotential point in an electrical device, either at a terminus, or not at a terminus. Voltage sources of −48 volts are widely used in telecommunications applications; nearly all telephone central offices are powered from −48 volt sources wherein the "hot" side of the supply is negative with respect to ground.

Hot swap controller 8 is disposed on prior art telecommunications power card 2, and is coupled to positive ground node 4 and negative $V_{IN}$ node 6 from which it derives approximately −48 volts when connected to an active power source providing −48 volts. Hot swapping (also known as hot plugging) is the ability to add, remove and replace components of a system while the system is powered. In the context of telecommunications applications, the hot swapping of power sources, such as batteries or power supplies, is commonly performed.

Capacitor 10 is electrically coupled to hot swap controller 8 at nodes 12 and 14. Increases of voltage correspondingly store excess charge in the capacitor, thus moderating the change in output voltage and current induced by a transient power event.

Since it is desirable to provide less than the ±48V input for a load that is coupled to telecommunications power card 2, (e.g. +3.3 volts), a DC to DC converter 16 is provided on telecommunications power card 2 and is electrically coupled to hot swap controller 8 at nodes 12 and 14. Thus, capacitor 10 and DC to DC converter 16 are arranged in parallel fashion. DC to DC converter 16 is a load with respect to the power output of hot swap controller 8.

In electrical engineering, a DC to DC converter is a circuit which converts a source of direct current from one voltage to another. A DC to DC converter may serve to isolate an input power source (i.e. hot swap controller 8 from the load connected to the output of the DC to DC converter at common node 18 and $V_{OUT}$ node 20, DC to DC converters are commercially available as blocks or modules from Datel, Power Trends, Integrated Power Designs, or others.

FIG. 2 is a schematic diagram which depicts one form of a current limiter 22 of the prior art. Current limiter 22 is coupled to common node 4 and negative $V_{IN}$ node 6. These nodes provide power to the current limiter 22 which in turn provides power to the other components of hot swap controller 8 via $V_{OUT}$ node 24 and common node 4. Current source 26 is coupled to common node 4, and provides a constant reference current. It is comprised of voltage reference source 28 resistor R1, amplifier 30, and transistor 32 which are arranged in a well known configuration to provide constant current I1 based on the reference voltage provided by voltage reference source 28.

Resistor R2 is coupled to current source 26 at node 34 and to negative $V_{IN}$ node 6. The constant current provided by current source 26 flows through resistor R2 producing reference voltage V1 across resistor R2 such that:

$$V1 = I1 \cdot R2$$

Resistor $R_{SENSE}$ is coupled to negative $V_{IN}$ node 6 and to pass transistor 36 which acts as a circuit breaker at node 38. When the circuit is not broken by pass transistor 36, current flows between negative $V_{IN}$ node 6 and $V_{OUT}$ node 24. The purpose of resistor $R_{SENSE}$ is to sense the current I2 flowing between negative $V_{IN}$ node 6 and $V_{OUT}$ node 24 and produce a voltage $V_{SENSE}$ at node 38 such that:

$$V_{SENSE} = I2 \cdot R_{SENSE}$$

Comparator 40 is coupled to node 34 and to node 38 such that it compares voltage $V_{SENSE}$ to voltage V1. The output of comparator 40 is coupled to latch 42 indicating when the circuit should be broken or modified. During normal operation, $V_{SENSE}$ is less than V1, so comparator 40 signals that the circuit should not be broken. When $V_{SENSE}$ exceeds V1, comparator 40 signals that the circuit should be broken or modified in some way.

Constant current I1 is only a small fraction of the current limit. R2 can be chosen to produce the reference voltage corresponding to the desired limit for current I2 as sensed by resistor $R_{SENSE}$. Since the resistance value of R2 is multiplied by constant current I1, higher reference voltages can be achieved by increasing the resistance value of R2.

Latch 42 is coupled to the output of comparator 40 and to pass transistor 36. When comparator 40 signals that the circuit should be broken, latch 42 propogates the signal to pass transistor 36, breaking the circuit. Latch 42 maintains the signal to break the circuit until receiving a resetsignal via reset node 44. As will be appreciated by those skilled in the art, there are many alternatives to Latch 42 for various applications.

FIG. 3 is a diagram depicting the operation of the current limiter of the prior art, with current I shown on the vertical axis, (increasing from bottom to top,) and voltage V shown on the horizontal axis, (increasing from left to right.) $I_{CB}$ and the corresponding dashed line represent the current level at which the circuit breaker will break the circuit. A diagonal line representing constant power supplied to DC to DC converter 16 is shown, labeled as P=k. At lower voltages, the current is high, and at higher voltages, the current is low. More formally, the current and voltage satisfy the following equation:

$$P = I \cdot V = k$$

As shown in FIG. 3, at lower voltages there is a safety factor preventing premature breakage of the circuit by the circuit breaker. $I_{CB}$ is chosen to be low enough that the circuit is broken before damage caused by the over current condition is done to the load, (such as DC to DC converter 16,) and high enough that premature circuit breakage does not interfere with normal operation. For the same power, but high operating voltage the corresponding safety factor is too large, by as much as a factor of 2 or more. At these high voltages, the so called safety factor preventing premature circuit breakage is so high that the power level required to reach $I_{CB}$ could cause damage to the load. Attempts to remedy this kind of failure by lowering $I_{CB}$ can result in premature circuit breakage at lower voltages.

These and other limitations of the prior art will become apparent to those of skill in the art upon a reading of the following descriptions and a study of the several figures of the drawing.

SUMMARY

In certain non-limiting exemplary embodiments, an exemplary adaptive current limiter is disclosed which is coupled at two input nodes to a power input, and which is comprised of a circuit breaker, a sensing resistor coupling one node of the power input to the circuit breaker, a variable reference voltage generator coupled to the power input, and which provides a variable reference voltage which is inversely proportional to the input voltage, a comparator having a first input node coupled to a circuit breaker side of said sensing resistor and a second input node coupled to said variable reference voltage, said comparator having a variable circuit breaker voltage output coupled to said circuit breaker, said variable circuit breaker voltage providing a current limit set point for said circuit breaker whereby said current limit set point for said circuit breaker is inversely proportional to said input voltage.

In certain non-limiting exemplary embodiments, a variable reference voltage generator provides two different variable reference voltages.

In certain non-limiting exemplary embodiments, two comparators are used, each of which is respectively coupled to the two provided reference voltages.

In certain non-limiting exemplary embodiments, a variable reference voltage generator includes two current sources connected in series across the power input lines.

In certain non-limiting exemplary embodiments, one of the current sources connected in series is a fixed current source, and another is a variable current source.

In certain non-limiting exemplary embodiments, a shunt resistor is disposed in parallel with a variable current source.

In certain non-limiting exemplary embodiments, two shunt resistors are connected in series with respect to each other forming a voltage divider which is connected in parallel with a variable current source.

In certain non-limiting exemplary embodiments, an input voltage divider is coupled across the power source, and a variable current source has a control input coupled to the input voltage divider.

In certain non-limiting exemplary embodiments, two current sources are provided: one current source comprises a resistor in series with a MOSFET, and an input of an amplifier coupled to the node which connects the aforementioned resistor and MOSFET, with the output of the amplifier coupled to the gate of the MOSFET and another current source comprising a second resistor in series with a second MOSFET, with a second amplifier's output coupled to said second MOSFET.

In certain non-limiting exemplary embodiments, a MOSFET is provided as a circuit breaker, and a variable circuit breaker voltage is applied to a gate of said MOSFET.

Certain non-limiting exemplary embodiments employ a method for creating a constant power circuit breaker threshold comprising generating a variable current proportional to an input voltage, generating a fixed current from a fixed reference voltage, subtracting the variable current from the fixed current; creating a resultant current which is inversely proportional to the input voltage and creating a variable circuit breaker voltage from said resultant current.

In certain non-limiting exemplary embodiments the aforementioned resultant current is created by shunting a portion of the current in parallel to said variable current.

In certain non-limiting exemplary embodiments, the aforementioned creation of a variable circuit breaker voltage involves creating not one, but two variable circuit breaker voltages from the aforementioned resultant current.

Certain non-limiting exemplary embodiments provide a constant power circuit breaker threshold circuit comprising a means for generating a variable current proportional to an input voltage, a means for generating a fixed current from a fixed reference voltage, a means for subtracting the variable current from the fixed current, a means for creating a resultant current which is inversely proportional to the input voltage, and a means for creating a variable circuit breaker voltage from said resultant current.

In certain non-limiting exemplary embodiments the aforementioned means for generating a variable current comprises a voltage divider provided between a first input node and a second input node, and a variable current source controlled by said voltage divider.

In certain non-limiting exemplary embodiments the aforementioned means for generating a fixed current comprises a fixed current.

In certain non-limiting exemplary embodiments, the aforementioned means for subtracting the variable current from the fixed current comprises coupling said variable current source in series with said fixed current source.

In certain non-limiting exemplary embodiments, the aforementioned means for creating a resultant current comprises coupling a shunt resistance around said variable current source.

In certain non-limiting exemplary embodiments, the aforementioned means for creating a variable circuit breaker voltage comprises means for comparing a sensing voltage to a voltage derived from said resultant current.

In certain non-limiting exemplary embodiments, the aforementioned sensing voltage is derived from a sensing resistor coupled between an input and a load.

These and other embodiments and advantages of the bridge and other features disclosed herein will become apparent to those of skill in the art upon a reading of the following descriptions and a study of the several figures of the drawing.

BRIEF DESCRIPTION OF THE DRAWINGS

Several exemplary embodiments will now be described with reference to the drawings, wherein like components are provided with like reference numerals. The exemplary embodiments are intended to illustrate, but not to limit, the invention. The drawings include the following figures.

DETAILED DESCRIPTION OF EXEMPLARY EMBODIMENTS

Applications of the exemplary embodiments of an adaptive current limiter described herein include Power-over-Ethernet [32-60V], telecom [36-72V], and Firewire [8-33V] circuits;

and the current-sensed output is applied to a DC-DC converter input. Because the DC-DC converter's input is an approximately-constant power at any given load current, the converter's input current is inversely proportional to the value of the input voltage. For example, a converter with 3.3V @ 4.5A (15W) output may have a conversion efficiency of 90%, thus the input power will be approximately constant at 16.7W. The input current will be 0.557A with a 30V source voltage, while the input current will be 0.25 with a 67V source voltage.

Hot-swap controller current limit settings are normally chosen to prevent load disconnect at the maximum operating current expected in the load, while a doubling of the load current is often considered to be a fault condition where the load should be disconnected. This is appropriate when the input voltage to the load is fixed. If the maximum load current is expected to be 0.5A, then a load current of 1A is considered to be a fault, and the load disconnect point would be chosen to be somewhere above 0.5A yet below 1.0A.

In the case of a variable input voltage as described previously, it would be necessary to set the current-trip point at more than 0.557A and less than 1.1A to allow normal operation at the lowest input voltage of 30V. Yet 1.1A would be considered to be a gross overload at the highest input voltage of 67V.

Clearly, it is desirable to allow a hot-swap controller intended for use in any of the named applications to self adjust its current trip point inversely with the value of the input voltage. With such an adjustment capability, it would be possible to automatically set the current trip point between 0.557 and 1.1A at the 30V input, and dynamically change the current trip point to between 0.25A and 0.5A at the 67V input.

Figure 1:
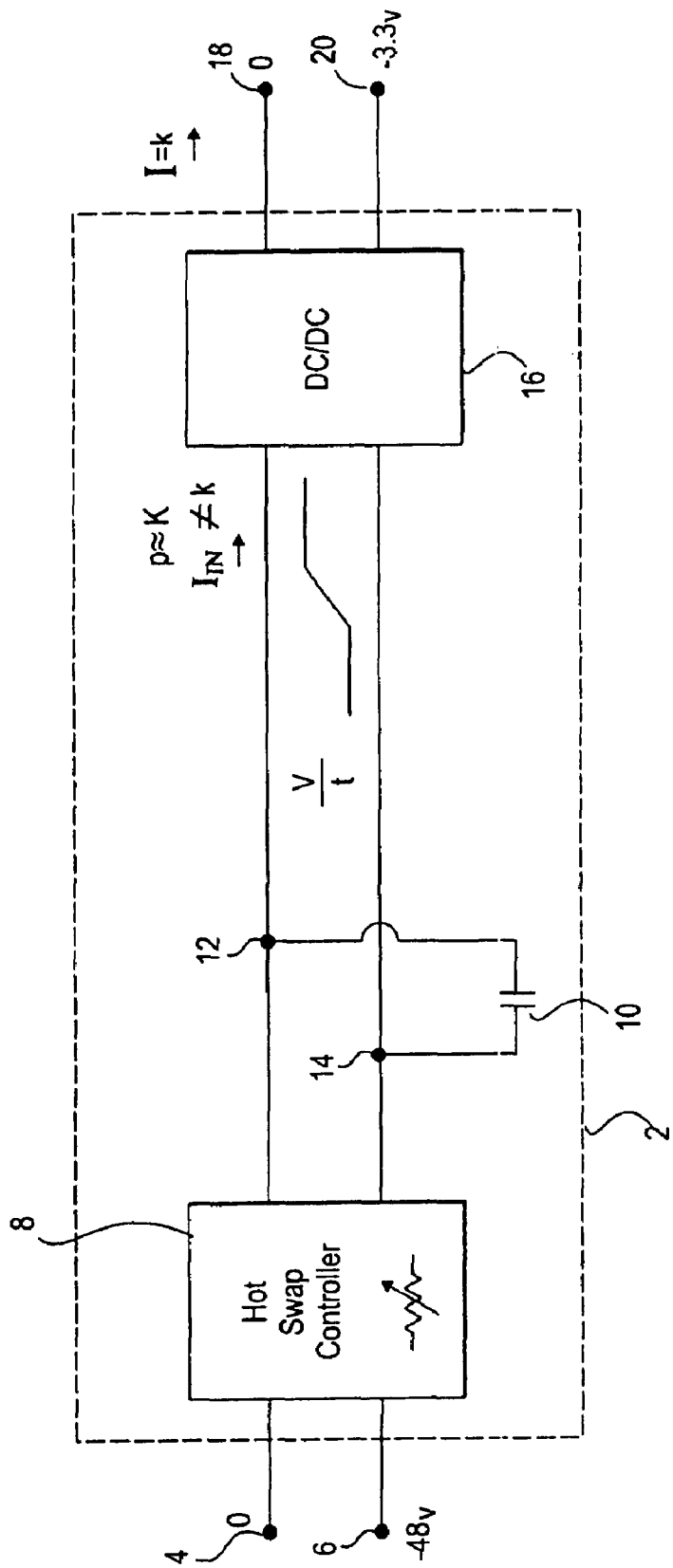
FIG. 1 is a schematic block diagram depicting a telecommunications power card of the prior art.
Figure 2:
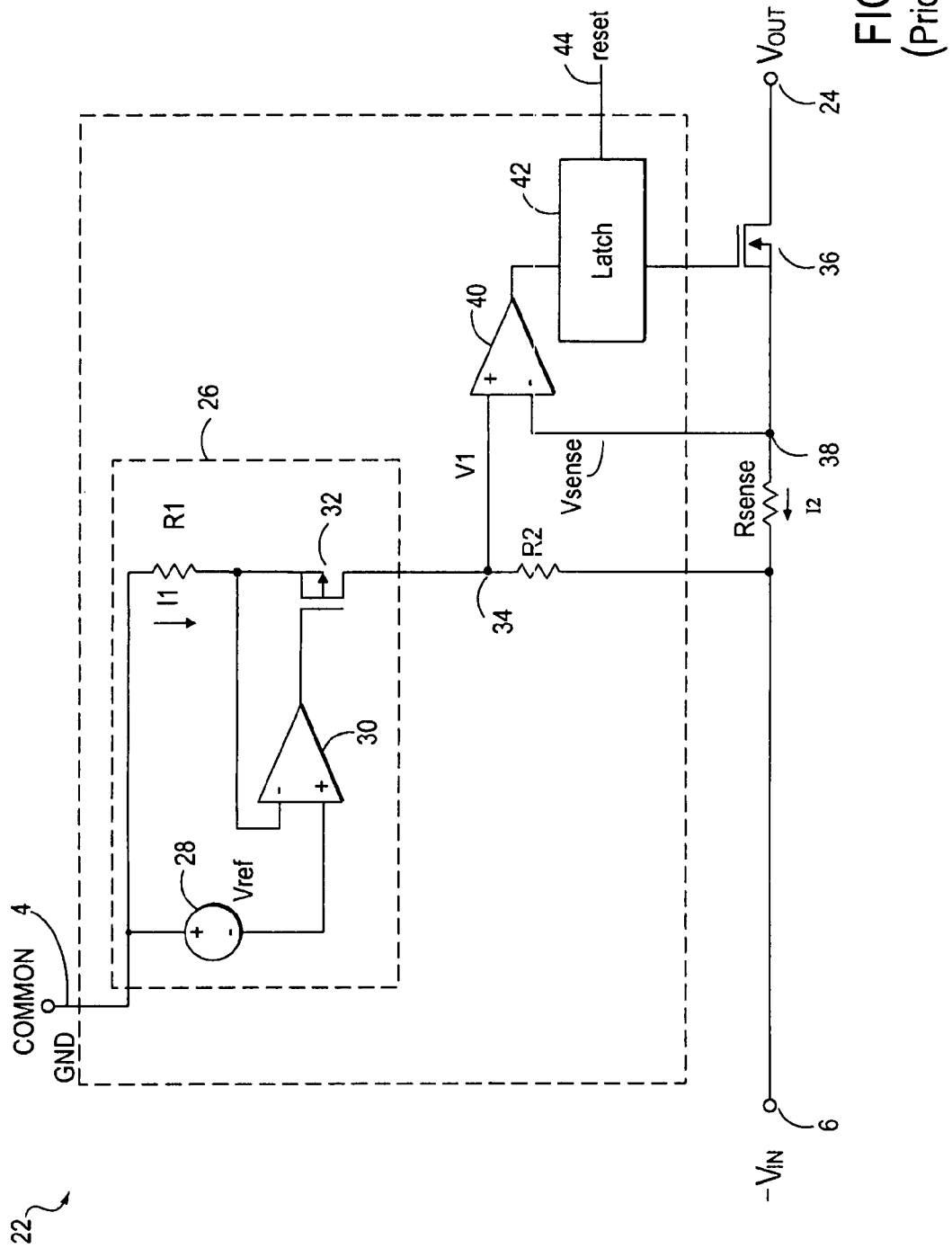
FIG. 2 is a schematic diagram which depicts one form of a current limiter of the prior art.
Figure 3:
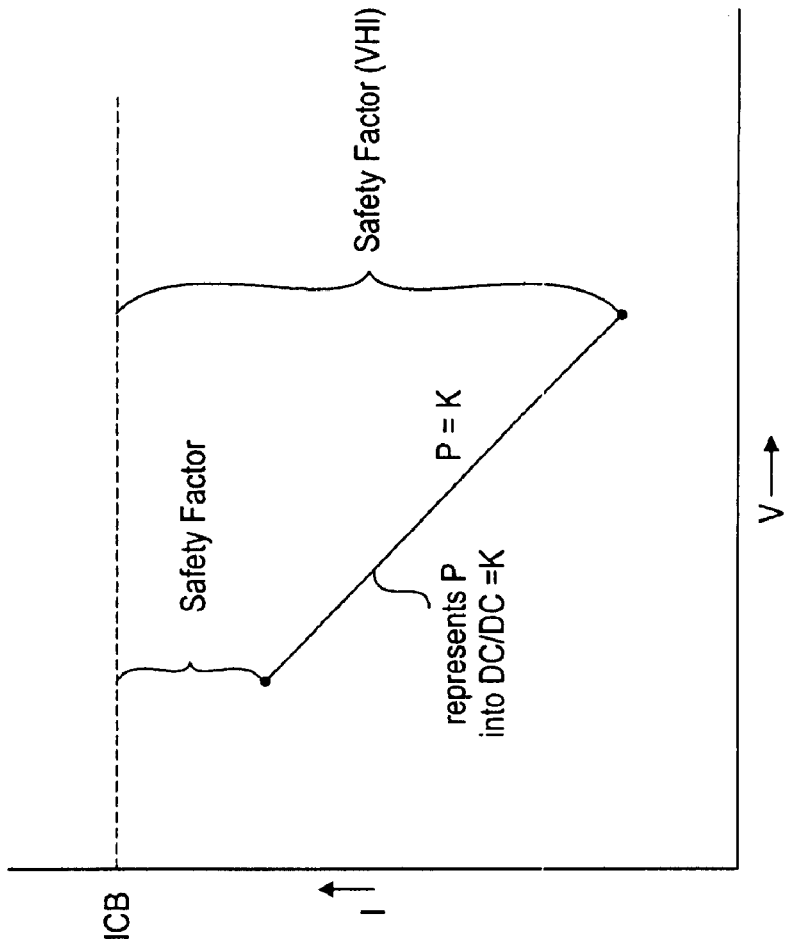
FIG. 3 is a diagram depicting the operation of the current limiter of the prior art.
Figure 4:
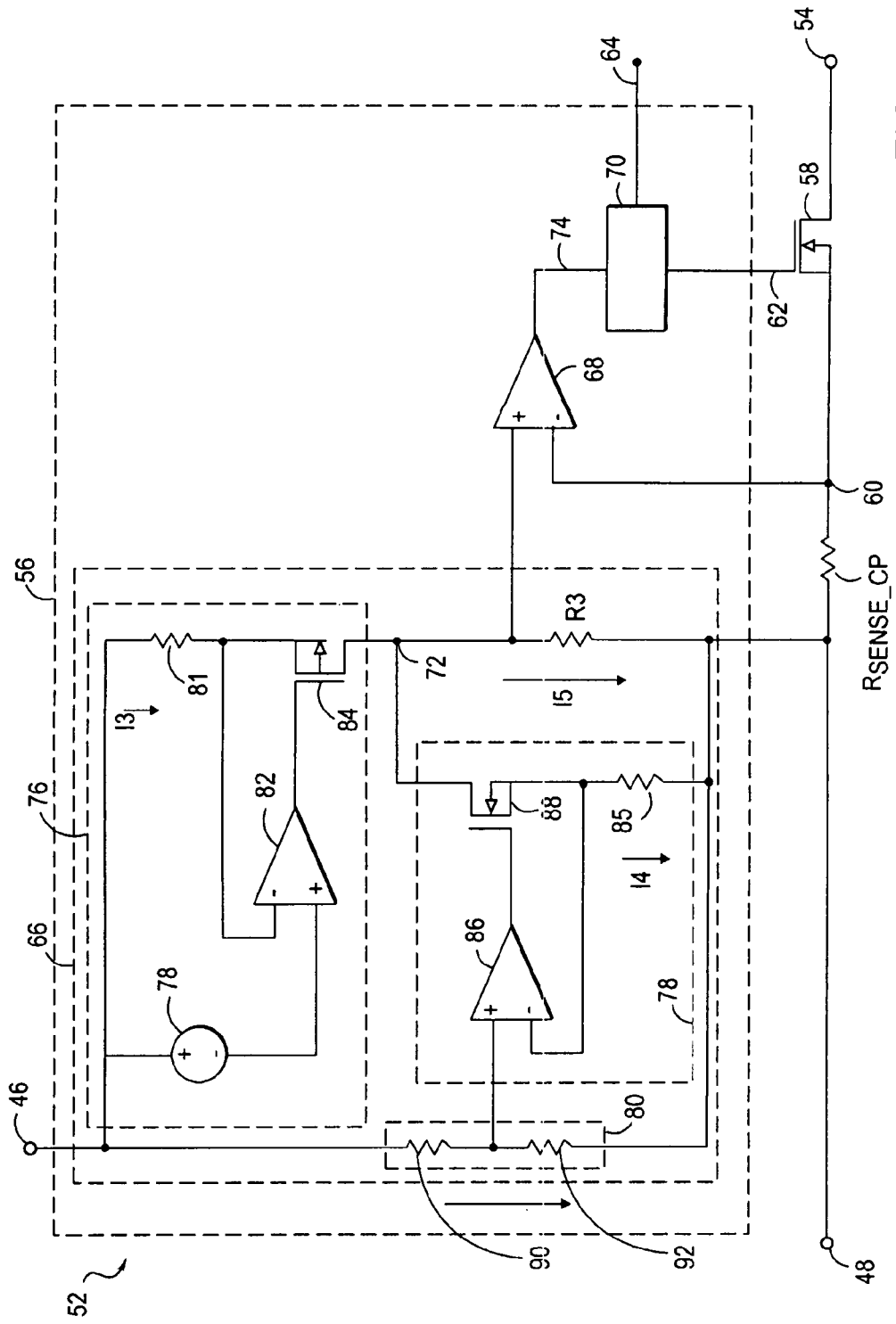
FIG. 4 is a schematic diagram which depicts an exemplary adaptive current limiter.

FIG. 4 is a schematic diagram which depicts an exemplary adaptive current limiter 52. By way of example and not limitation, in certain embodiments adaptive current limiter 52 is coupled to common node 46 and negative $V_{IN}$ node 48. These nodes provide power to the adaptive current limiter 52 which in turn provides power to the other components of a hot swap controller 50 (not shown) via $V_{OUT}$ node 54 and common node 46. In certain exemplary embodiments, adaptive current limiter 52 is comprised of an integrated circuit 56, resistor $R_{SENSE\_CP}$, and MOSFET pass transistor 58 which acts as a circuit breaker.

Integrated circuit 56 is coupled to resistor $R_{SENSE\_CP}$ at negative $V_{IN}$ node 48 and node 60 and uses resistor $R_{SENSE\_CP}$ to develop a voltage $V_{SENSE\_CP}$ at node 60. Voltage $V_{SENSE\_CP}$ is proportional to the electron current flowing between negative $V_{IN}$ node 48 and $V_{OUT}$ node 54 (through resistor $R_{SENSE\_CP}$, node 60, and MOSFET pass transistor 58); voltage $V_{SENSE\_CP}$ is thus representative of the load current of the load coupled to adaptive current limiter 52 as will be appreciated by those skilled in the art. There are innumerable embodiments of a load which can be coupled to adaptive current limiter 52. A DC/DC converter is one such non-limiting exemplary embodiment.

Integrated circuit 56 is coupled to MOSFET pass transistor 58 at gate node 62 and thus controls electron current flow along the path from negative $V_{IN}$ node 48 to $V_{OUT}$ node 54 (through resistor $R_{SENSE\_CP}$, node 60, and MOSFET pass transistor 58.) When the output power level associated with common node 46 and $V_{OUT}$ node 54 exceeds a predefined limit, integrated circuit 56 signals to MOSFET pass transistor 58 that the electron current flow should be interrupted by altering the voltage supplied to MOSFET pass transistor 58 via gate node 62.

The current flow remains interrupted until integrated circuit 56 determines that the power should be restored and signals to MOSFET pass transistor 58 that power should be restored. In certain exemplary embodiments, this determination is made externally to integrated circuit 56 by, for example, a user pressing a reset button or by another electronic device which makes the determination that current flow should be restored. In certain exemplary embodiments, optional signal path 64 is used to convey signals pertinent to the determination to restore current flow. In other exemplary embodiments, the determination to restore power is made internally to integrated circuit 56.

With continuing reference to FIG. 4, integrated circuit 56 is comprised of variable voltage source 66, comparator 68 and application specific circuit 70. Variable voltage source 66 is coupled to common node 46 and to negative $V_{IN}$ node 48 and produces offset voltage E1 at node 72.

Node 72 is coupled to comparator 68 at its (+) input thereby applying offset voltage E1 to the (+) input of comparator 68. The (−) input of comparator 68 is coupled to node 60 thereby applying voltage $V_{SENSE\_CP}$ to the (−) input of comparator 68. When the magnitude of voltage $V_{SENSE\_CP}$ equals or exceeds the magnitude of offset voltage E1, the comparator signals an overload condition on its output which is coupled to overload signal node 74. An input of application specific circuit 70 is coupled to overload signal node 74. An output of application specific circuit 70 is coupled to gate node 62, thereby applying the output of application specific circuit 70 to MOSFET pass transistor 58. An optional input of application specific circuit 70 is optionally coupled to optional signal path 64. Application specific circuit 70 serves to propagate overload signals to MOSFET pass transistor 58.

In certain non-limiting exemplary embodiments, application specific circuit 70 comprises a latch which outputs a signal indicating whether or not an overload condition has occurred since power was initially applied via common node 46 and negative $V_{IN}$ node 48 or since a "reset" has been received via optional signal path 64.

With continuing reference to FIG. 4, in certain exemplary embodiments, variable voltage source 66 is disposed to produce voltage E1, the magnitude of which is inversely proportional to input voltage $V_{IN}$ developed between common node 46 and negative $V_{IN}$ node 48.

In certain exemplary embodiments, variable voltage source 66 is comprised of constant current source 76, variable current source 78, voltage divider 80, and resistor R3.

In certain exemplary embodiments, constant current source 76 is coupled to common node 46 and to node 72. Current source 76 produces a constant current I3 which flows between common node 46 and node 72. Constant current source 76 is comprised of constant reference voltage source 78, resistor 81, amplifier 82, and transistor 84 which are configured as shown to produce a constant current source, as will be appreciated by those skilled in the art.

In certain exemplary embodiments, variable current source 78 is coupled to node 72, to negative $V_{IN}$ node 48, and to the output of voltage divider 80. Voltage divider 80 is comprised of resistor 90 and resistor 92 configured as shown to comprise a voltage divider 80 as will be appreciated by those skilled in the art. Variable current source 78 produces a variable current I4 flowing from node 72 to negative $V_{IN}$ node 48 which is directly proportional to voltage $V_{IN}$. As will be appreciated by those skilled in the art, variable current source 78 as described herein is in series with constant current source 76. Variable current source 78 is comprised of resistor 85, amplifier 86, and transistor 88 which are configured as shown as a variable current source with a variable reference voltage applied to the (+) input of amplifier 86.

In certain exemplary embodiments, resistor R3 is coupled to node 72 and to negative $V_{IN}$ node 48. As will be appreciated by those skilled in the art, resistor R3 is connected in parallel to variable current source 78 and in series with constant current source 76. A current I5 flows through resistor R3, across which voltage E1 is developed at node 72.

Since current I3 flows to node 72 and both current I4 and I5 flow from node 72 to negative $V_{IN}$ node 48, the sum of variable current I4 and current I5 must equal I3:

$$I4+I5=I3$$

It follows that I5 is the difference between I3 and I4:

$$I5=I3-I4$$

Current I4 is proportional to $V_{IN}$; the magnitude of I4 increases linearly with the magnitude of $V_{IN}$. If I4 were to be plotted on a graph over the domain of $V_{IN}$, it would form a line with positive slope. A line of negative slope is required in order to achieve a constant-power trip point; as $V_{IN}$ increases, the associated current-limit trip point must decrease linearly. To obtain a line of negative slope, I4 is negated as shown in the above equation.

Current I3 is a constant positive current from which I4 may be subtracted to obtain a non-negative current I5 which would produce a line of negative slope when plotted over the domain of $V_{IN}$. As input voltage increases, current I5 decreases. Voltage E1 is developed across R3 as current I5 passes through it, and is thus inversely proportional to $V_{IN}$. Since E1 is applied to the (+) input of comparator 68, it produces a constant-power limit to which voltage $V_{SENSE\_CP}$ may be compared by comparator 68.

As will be appreciated by those skilled in the art, constant current I3 represents the constant-power trip point associated with exemplary adaptive current limiter 52. As I3 increases, the constant-power trip point increases. Thus, one can affect the constant-power trip point by altering the constant reference voltage of constant current source 76.

Figure 5:
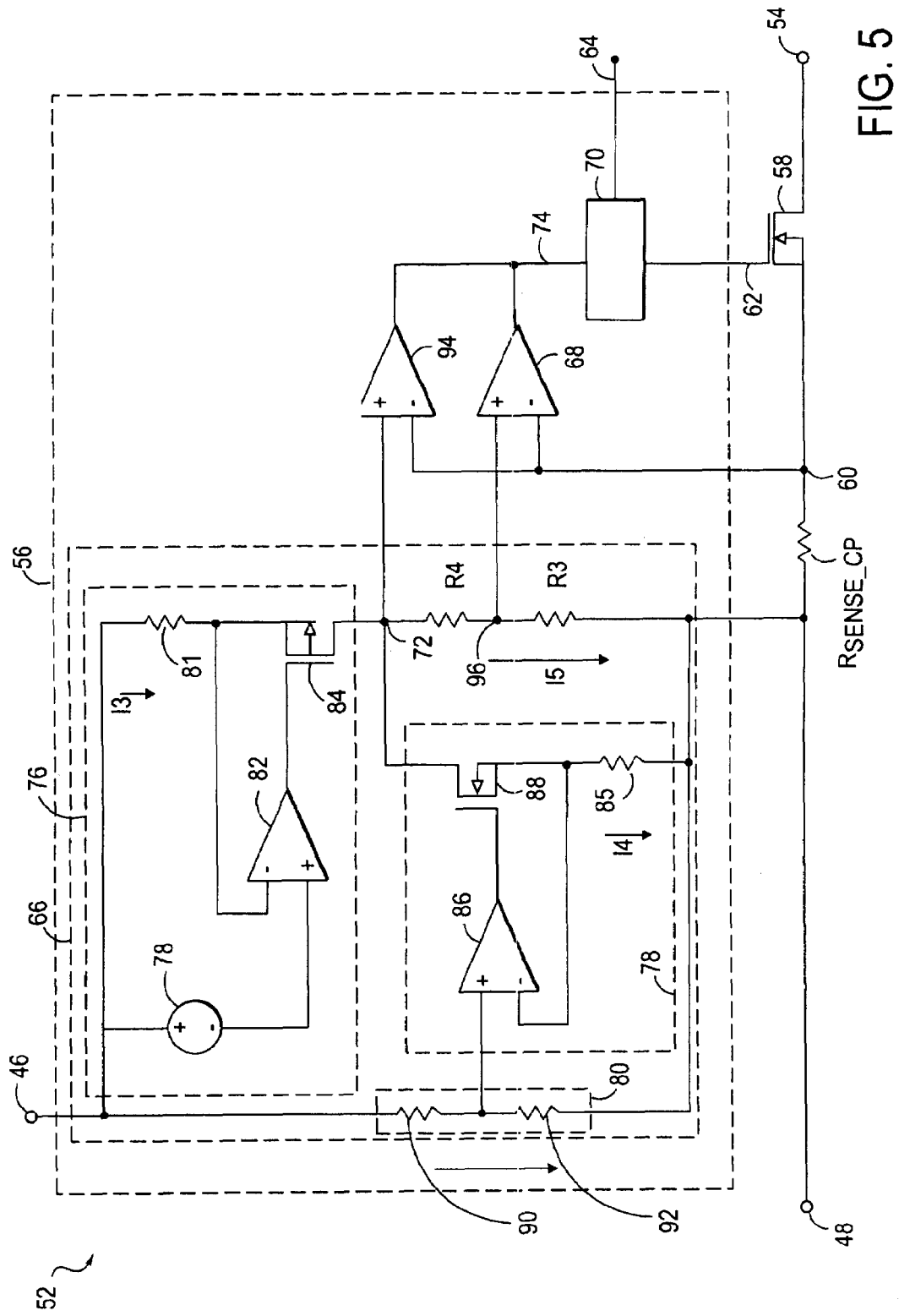
FIG. 5 is a schematic diagram depicting an alternative exemplary embodiment wherein a variable voltage source outputs a plurality of different voltages.

FIG. 5 is a schematic diagram depicting an alternative exemplary embodiment wherein variable voltage source 66 outputs a plurality of different voltages. In this non-limiting exemplary embodiment, resistor R3 is coupled to node 96 and to negative $V_{IN}$ node 48, a resistor R4 is coupled to node 72 and to node 96, comparator 68 is coupled to node 96 at its (+) input to node 60 at its (−) input, and to node 74 at its output, and a comparator 94 is coupled to node 72 at its (+) input, to node 60 at its (−) input, and to node 74 at its output. This configuration allows variable voltage source 66 to produce two variable voltages E1 at node 96 and E2 at node 72 wherein both E1 and E2 are inversely proportional to $V_{IN}$ and E1 is a fraction of E2. In this exemplary embodiment, resistors R4 and R3 comprise a voltage divider as will be appreciated by those skilled in the art.

In certain exemplary embodiments, comparator 94 will operate at a different speed than comparator 68. For example, in certain exemplary embodiments, comparator 94 will be a fast acting comparator, while comparator 68 will be a slow acting comparator. In such a configuration, a transient over-current condition may not cause the circuit to be broken, as long as its duration is less than the time it takes comparator 68 to act, and its magnitude does not exceed the higher constant-power current-limit trip point enforced by fast acting comparator 94.

Figure 6:
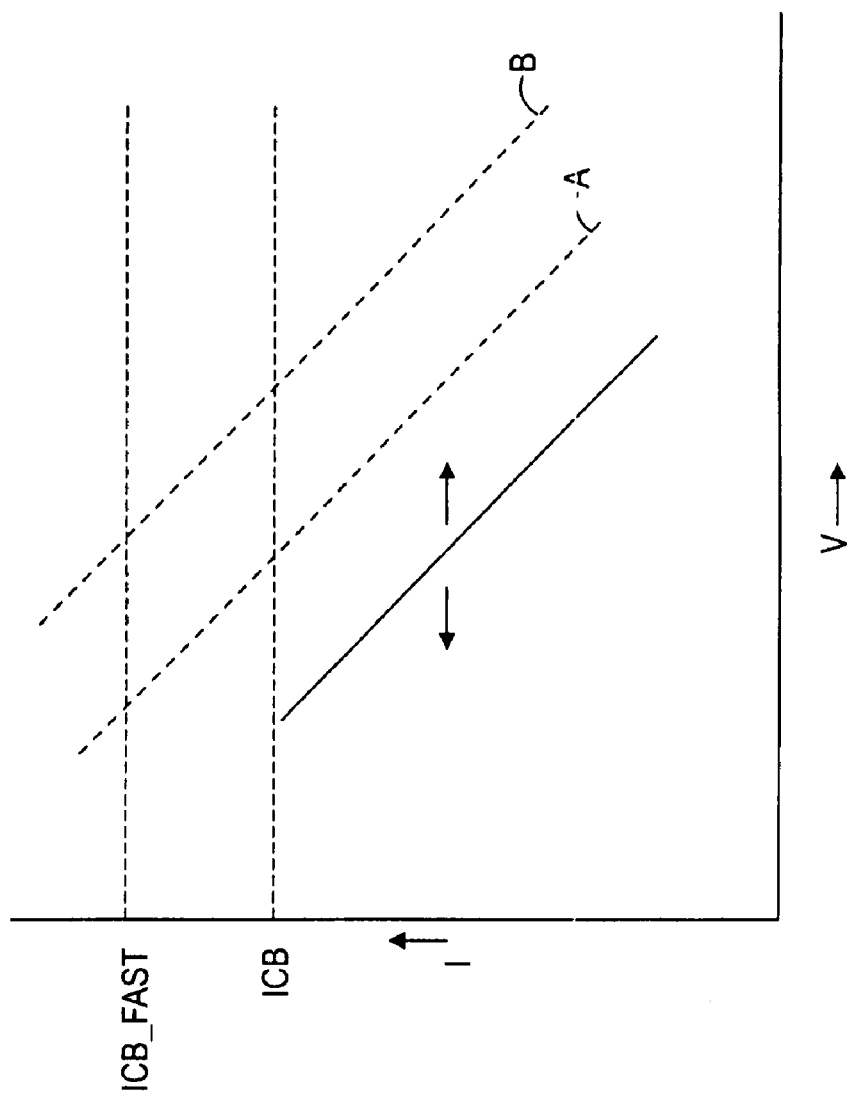
FIG. 6 is a diagram depicting a comparison of the constant-current-limit trip point circuit breaker with the constant-power trip point circuit breaker disclosed herein.

FIG. 6 is a diagram depicting a comparison of the constant-current-limit trip point circuit breaker with the constant-power trip point circuit breaker disclosed herein. The lines labeled $I_{CB}$ and $I_{CB\_FAST}$ represent slow and fast fixed current levels respectively. The solid diagonal line is a line of constant power wherein current I is inversely proportional to voltage V representing the power level below which an electrical device is expected to operate. The dashed diagonal line labeled A is a line of constant-power representing a constant-power limit which, if exceeded, will cause the circuit to be broken. Similarly, the dashed diagonal line labeled B will cause the circuit to be broken (preferably at a higher power level using a faster comparator than used at the power level represented by the dashed line labeled A.)

As can be seen in FIG. 6, there is a safety margin between the expected operating power, and the constant-power trip points A and B. In a non-limiting exemplary embodiment the circuit would be broken if the operating power level exceeds the constant-power trip point, which at the low end of the voltage range, allows for current levels higher than $I_{CB}$, as shown.

Figure 7:
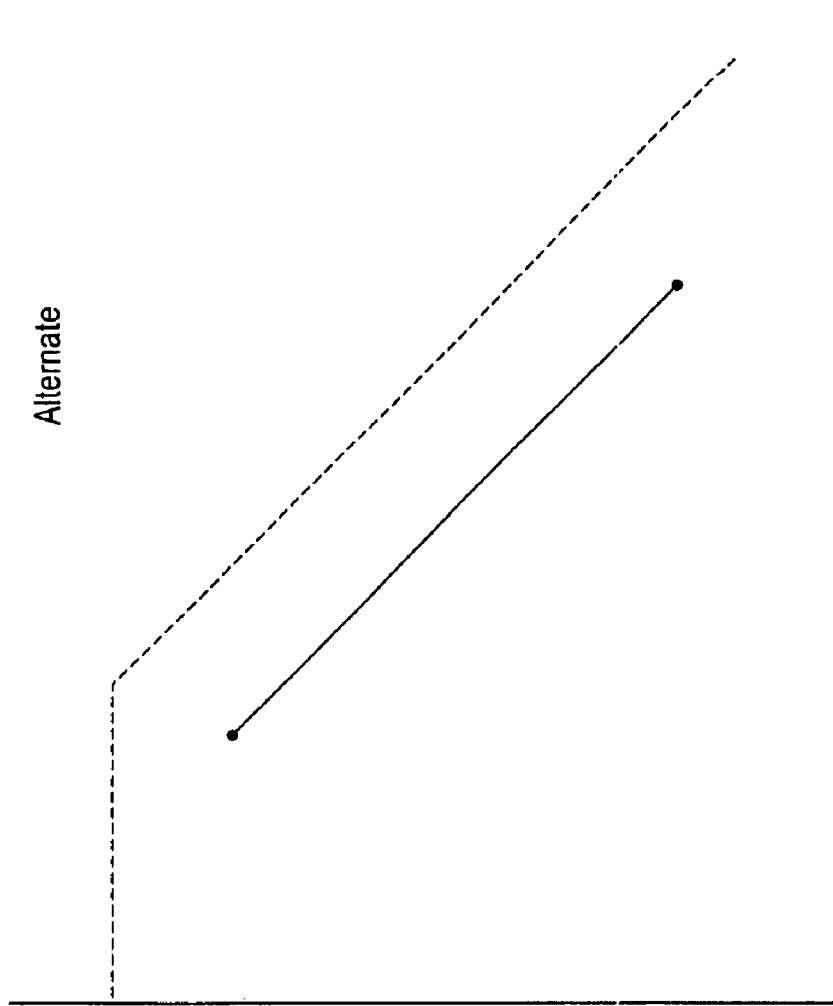
FIG. 7 is a diagram depicting the operation of an alternate embodiment wherein the constant-power trip point is combined with a fixed-current trip point which imposes a fixed-current limit at the lower end of the voltage range.

FIG. 7 depicts an alternate embodiment wherein the constant-power trip point is combined with a fixed-current trip point which imposes a fixed-current limit at the lower end of the voltage range. This alternate embodiment may be achieved, for example, by connecting a fixed-current trip point current limiter in parallel with adaptive current limiter 52. Numerous other embodiments which achieve this dual-limit effect will be readily apparent to those skilled in the art.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An adaptive current limiter comprising:
   a first input node and a second input node;
   a circuit breaker;
   a sensing resistor coupling said first input node to said circuit breaker;
   a variable reference voltage generator coupled between said first input node and said second input node to provide a first variable reference voltage which is inversely proportional to an input voltage developed between said first input node and said second input node and to provide a second variable reference voltage different from said first variable reference voltage; and
   a comparator having a first input node coupled to a circuit breaker side of said sensing resistor and a second input node coupled to said variable reference voltage, said comparator having a variable circuit breaker voltage output coupled to said circuit breaker, said variable circuit breaker voltage providing a current limit set point for said circuit breaker;
   whereby said current limit set point for said circuit breaker is inversely proportional to said input voltage.

2. An adaptive circuit limiter as recited in claim 1 wherein said comparator is a first comparator coupled to said first variable reference voltage, and further comprising a second comparator coupled to said second variable reference voltage.

3. An adaptive circuit limiter as recited in claim 1 wherein said variable reference generator includes a first current source and a second current source.

4. An adaptive circuit limiter as recited in claim 3 wherein said first current source is a variable current source and said second current source is a substantially fixed current source.

5. An adaptive circuit limiter as recited in claim 4 further comprising a shunt resistor coupled in parallel with said first current source.

6. An adaptive circuit limiter as recited in claim 5 wherein said shunt resistor is a first shunt resistor, and further comprising a second shunt resistor in series with said first shunt resistor to provide a shunt voltage divider provided in parallel with said first current source.

7. An adaptive circuit limiter as recited in claim 4 further comprising an input voltage divider coupled between said first input node and said second input node, wherein said first current source has a control input coupled to said voltage divider.

8. An adaptive current limiter as recited in claim 3 wherein said first current source comprises a first resistor in series with a first MOSFET to provide a first node therebetween, and a first current source comparator having an input coupled to said first node and an output coupled to a gate of said first MOSFET, and wherein said second current source comprises a second resistor in series with a second MOSFET to provide a second node there between, and a second current source comparator having an input coupled to said second node and an output coupled to a gate of said second MOSFET.

9. An adaptive current limiter as recited in claim 1 wherein said circuit breaker includes a MOSFET.

10. A method for creating a constant power circuit breaker threshold comprising:
   generating a variable current proportional to an input voltage;
   generating a fixed current from a fixed reference voltage;
   subtracting the variable current from the fixed current;
   creating a resultant current which is inversely proportional to the input voltage; and
   creating a variable circuit breaker voltage from said resultant current.

11. A method for creating a constant power circuit breaker threshold as recited in claim 10 creating said resultant current is accomplished by shunting a portion of the current in parallel to said variable current.

12. A method for creating a constant power circuit breaker as recited in claim 10 wherein crating a variable circuit breaker voltage is creating a first variable circuit breaker voltage, and further comprising creating a second variable circuit breaker voltage from said resultant current.

13. A constant power circuit breaker threshold circuit comprising:
   means for generating a variable current proportional to an input voltage;
   means for generating a fixed current from a fixed reference voltage;
   means for subtracting the variable current from the fixed current;
   means for creating a resultant current which is inversely proportional to the input voltage; and
   means for creating variable circuit breaker voltage from said resultant current.

14. A constant power circuit breaker threshold circuit as recited in claim 13 wherein said means for generating a variable current comprises a voltage divider provided between a first input node and a second input node, and a variable current source controlled by said voltage divider.

15. A constant power circuit breaker threshold circuit as recited in claim 14 wherein said means for subtracting the variable current from the fixed current comprises coupling said variable current source to said fixed current source.

16. A constant power circuit breaker threshold circuit as recited in claim 15 wherein said means for creating a resultant current comprises coupling a shunt resistance around said variable current source.

17. A constant power circuit breaker threshold circuit as recited in claim 13 wherein said means for creating a variable circuit breaker voltage comprises means for comparing a sensing voltage to a voltage derived from said resultant current.

18. A constant power circuit breaker threshold circuit as recited in claim 17 wherein said sensing voltage is derived from a sensing resistor coupled between an input and a load.

\* \* \* \* \*